United States Patent [19]

Shankar et al.

[11] Patent Number: 5,909,550

[45] Date of Patent: Jun. 1, 1999

[54] CORRELATION TECHNIQUE FOR USE IN MANAGING APPLICATION-SPECIFIC AND PROTOCOL-SPECIFIC RESOURCES OF HETEROGENEOUS INTEGRATED COMPUTER NETWORK

[75] Inventors: Ravindra Shankar; Frank Maly, both of Cary, N.C.

[73] Assignee: Cisco Technology, Inc., San Jose, Calif.

[21] Appl. No.: 08/732,998

[22] Filed: Oct. 16, 1996

[51] Int. Cl.$^6$ .................................................. G06F 13/00
[52] U.S. Cl. .............................. 395/200.57; 395/200.57; 395/200.47; 395/200.68; 370/60
[58] Field of Search .................... 395/200.15, 200.09, 395/200.1, 182.02, 200, 329, 615, 650, 200.57; 370/60

[56] References Cited

U.S. PATENT DOCUMENTS

| | | | |
|---|---|---|---|
| 4,545,013 | 10/1985 | Lyon et al. ............................. | 364/200 |
| 4,644,532 | 2/1987 | George et al. . | |
| 4,827,411 | 5/1989 | Arrowood et al. . | |
| 4,922,486 | 5/1990 | Lidinsky et al. . | |
| 4,965,772 | 10/1990 | Daniel et al. . | |
| 5,050,165 | 9/1991 | Yoshioka et al. ..................... | 370/85.13 |
| 5,226,120 | 7/1993 | Brown et al. ......................... | 395/200 |
| 5,287,103 | 2/1994 | Kasprzyk et al. . | |
| 5,371,852 | 12/1994 | Attanasio et al. . | |
| 5,491,796 | 2/1996 | Wanderer et al. .................. | 395/200.09 |
| 5,526,358 | 6/1996 | Gregerson et al. .................. | 395/200.1 |
| 5,544,162 | 8/1996 | Mraz et al. .............................. | 370/60 |
| 5,557,798 | 9/1996 | Skeen et al. .......................... | 395/650 |
| 5,559,955 | 9/1996 | Dev et al. ........................... | 395/182.02 |
| 5,583,862 | 12/1996 | Callon ..................................... | 370/397 |
| 5,586,254 | 12/1996 | Kondo et al. ........................ | 395/200.1 |
| 5,588,119 | 12/1996 | Vincent et al. ..................... | 395/200.15 |
| 5,684,967 | 11/1997 | McKenna et al. ...................... | 395/329 |
| 5,684,988 | 11/1997 | Pitchaikani et al. .................... | 395/615 |
| 5,737,525 | 4/1998 | Picazo, Jr. et al. ............... | 395/200.02 |

OTHER PUBLICATIONS

SNMP, a guide to network management. Dr Sidnie Feit, McGrawHill Inc, pertinent pp. (251,373,440), 1995.

Printout of World Wide Web page http://www.ctron.com/products/items/Spectrum–Bluevision entitled "Spectrum/Blue Vision—for integrated SNA/LAN mangement", copyright 1995, 1996.

*Primary Examiner*—Frank J. Asta
*Assistant Examiner*—Thong Vu
*Attorney, Agent, or Firm*—Cesari and McKenna, LLP

[57] ABSTRACT

Heterogeneous resources of an integrated network environment are managed from a single network management station by correlating information pertaining to those resources. The integrated network environment is generally managed by a predetermined application tool executing on the management station that provides an application-centric map of the network for communicating with resources conversant with the application tool. Information pertaining to other protocol-specific resources are overlaid on the map to facilitate monitoring of those specific resources by the application tool. As a result, the station can interactively access the application-centric resources while also obtaining status information from the protocol-specific resources of the network.

29 Claims, 4 Drawing Sheets

CORRELATION TECHNIQUE FOR USE IN MANAGING APPLICATION-SPECIFIC AND PROTOCOL-SPECIFIC RESOURCES OF HETEROGENEOUS INTEGRATED COMPUTER NETWORK

FIELD OF THE INVENTION

This invention relates to computer networks and, more particularly, to management of heterogeneous resources in an integrated computer network environment.

BACKGROUND OF THE INVENTION

A computer network is a geographically distributed collection of interconnected subnetworks for transporting data between stations, such as computers. A local area network (LAN) is an example of such a subnetwork consisting of a transmission medium, such as coaxial cable or twisted pair, that provides relatively short distance communication among interconnected stations. The stations typically communicate by exchanging discrete packets or frames of data according to predefined protocols. In this context, a protocol consists of a set of rules defining how the stations interact with each other.

Most networks are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers and protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each station of the network.

Figure 1:
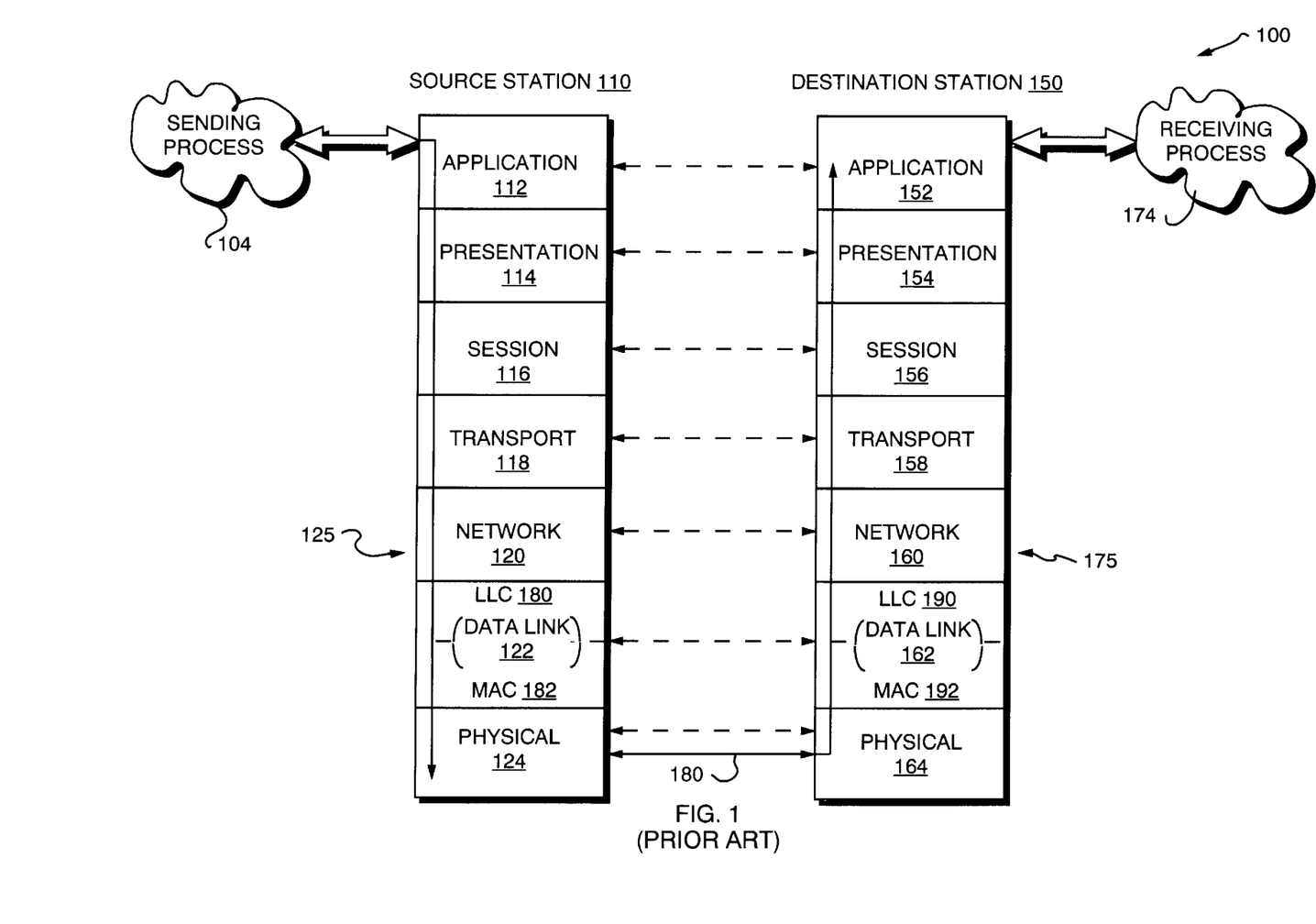
FIG. 1 is a schematic block diagram of prior art protocol stacks used to transmit data between a source station and a destination station of a computer network.

FIG. 1 illustrates a schematic block diagram of prior art protocol stacks 125 and 175 used to transmit data between a source station 110 and a destination station 150, respectively, of a LAN 100. Each protocol stack comprises a collection of protocols, one per layer, and is preferably structured according to the OSI seven-layer model. As can be seen, the protocol stacks 125 and 175 are physically connected through a communications channel 180 at the physical layers 124 and 164. For ease of description, the protocol stack 125 will be described.

In general, the application layer 112 contains a variety of protocol functions that are commonly needed by software processes, e.g., sending process 104, executing on the station, while the presentation layer 114 is responsible for the presentation of transmitted data in a meaningful manner to the application layer. The session layer 116, transport layer 118 and, as described herein, the network layer 120 are substantially involved in providing pre-defined sets of services to aid in connecting the source station to the destination station.

IEEE standard 802 defines a flexible network architecture oriented to the implementation of LANs. Although it generally conforms with the OSI model, the IEEE approach addresses only the lowest two layers of that model, the physical and data link layers. Specifically, the physical layer 124 is concerned with the actual transmission of signals across the communication channel; in this context, the physical layer defines the types of cabling, plugs and connectors used in connection with the channel.

The data link layer 122, on the other hand, is responsible for transmission of data from one station to another. In the IEEE 802 architecture, the data link layer is divided into two sublayers: logical link control (LLC) and media access control (MAC). The LLC sublayer 180 allows the overlying network layer to access the services of the LAN without regard to the actual network implementation; more specifically, the LLC layer initiates control signal interchange, organizes data flow, interprets commands and generates responses.

The MAC sublayer 182 is primarily concerned with controlling access to the transmission medium and, to that end, defines rules or procedures by which the stations must abide in order to share the medium. The MAC layer further provides addressing and framing functions, the latter including the addition of header and trailer information needed to identify the boundaries of frames, to synchronize communication between source and destination stations.

Data transmission over the LAN 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted to the protocol stack 175 of the destination station 150, where they are passed up that stack to a receiving process 174. Data flow is schematically illustrated by solid arrows.

Although actual data transmission occurs vertically through the stacks, each layer is programmed as though such transmission were horizontal. That is, each layer in the source station 100 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of stack 175 until it arrives at the receiving process.

As noted, a significant function of each layer in the OSI model is to provide services to the other layers. One type of service offered by the layers is a "connectionless" network service where each transmitted packet carries the full address of its destination through the network. A key function of a router is determining the next station to which the packet is sent; this routing function is preferably performed by the network layer within each station. Moreover, a network layer protocol is generally used to implement a connectionless network service, the latter of which primarily defines a packet format. When the network layer receives a packet from the transport layer for transmission over the network, it encapsulates the packet with a header containing, inter alia, source and destination addresses. An example of a network layer protocol is Internet (IP) network layer protocol.

A vendor-developed network architecture in wide-spread use is the Systems Network Architecture (SNA) developed by International Business Machines Corp. SNA is a mainframe-oriented network architecture that also uses a layered approach. The services included within this architecture are generally similar to those defined in the OSI model, although local area networks typically do not conform completely to the SNA architecture. However, SNA is significant to LAN technology because a LAN must often connect to, and be made a logical part of, an SNA mainframe network.

Access to the LAN is typically shared among the stations in accordance with various access control methods depending upon the topology of the subnetwork and the type of transmission control employed. A popular subnetwork topology is a ring network that is typically formed by configuring the communication channel as a loop and coupling the stations at intervals around the loop. The stations communicate by transmitting and receiving discrete signals in the form of data frames according to predefined protocols. Acceptance of a frame by each station, in turn, is determined on the basis of an address contained in the frame.

With LANs that employ a ring topology, a commonly used access control method is token passing. Token passing is a form of distributed transmission control wherein all the stations on the subnetwork cooperate in controlling access to the communication channel. Here, a small message or token is passed from one station to the next along the ring. If the token is marked as free, the station receiving it can transmit a message over the ring. A token ring network is an example of a ring topology that uses token passing as an access control method.

Token ring networks may be interconnected using intermediate stations, such as a router or bridge, whose primary function is to transfer frames between the rings. A route is the path a frame travels through the subnetworks from a source station to a destination station. Depending upon how the rings are interconnected, there may be more than one possible path for a frame to follow. Once the source station has "discovered" an optimal path to the destination, it transmits specifically-routed frames over the subnetworks; as the name implies, these frames include information specifying the route to, along with the address of, the destination station.

Source-route-bridge (SRB) is a source routing technique used by a source station to discover the optimal path to a destination. According to this networking technique, the source station specifies the optimal route, which is determined in accordance with routing information acquired from the stations of the network. A special type of frame, called an explorer frame, is typically used by the source to collect and store that information in a routing information (RI) field of the frame.

In an embodiment of SRB networking, the source station issues an explorer frame that is received by each station on the local ring subnetwork. Here, the source is unaware of the MAC address of the intended destination station and the path (or paths) for reaching that station, so it issues the explorer frame having a broadcast address that all stations are configured to receive. Each bridge/router copies the frame and supplies information relating to the route (i.e., bridge and ring numbers) within the RI field; it then distributes the copy to all stations on its interconnected ring. Eventually, a copy of the broadcast explorer frame reaches every station on every LAN of the network. Each station may respond to the source by issuing a response frame containing its MAC address and the routing information. The source station examines the information contained in these response frames and selects an optimal path to the intended destination based on that information; it then may communicate with that destination by sending data frames over that selected path.

As noted, routers and bridges may be employed to interconnect a plurality of LANs; this, in turn, extends the effective "size" of the computer network and increase the number of communicating stations. Such an enlarged topology of internetworked computing stations requires services directed to managing the network. Lower-layer standards, such as IEEE 802, address network management to some extent, yet they typically do not deal with complex network management requirements associated with the higher network layers.

Network management applications are available to address certain of the management requirements of a complex network, but they typically deal with a single, protocol-centric view of the network. For example, SNA-based management systems (such as NetView) provide a SNA-centric view of entities coupled to the network. These entities include a physical unit (PU), i.e., a component that monitors a station's resources, and a logical unit (LU) which consists of logical services by which a user may access the SNA network. On the other hand, an IP-centric network view of resources (such as IP routers) is provided by management systems employing, e.g., a Simple Network Management Protocol (SNMP). Here, SNMP agents are associated with the routers and these agents communicate with the management console, e.g., a workstation, via a SNMP protocol.

A network management problem arises in the context of an integrated network environment comprising interconnected heterogeneous resources, such as SNA entities and IP routers. A host computer running, e.g., NetView is capable of managing the SNA entities and, in particular, the frame traffic originated by PU/LU components. However, because the routers are IP devices that encapsulate these frames within IP protocol packets, the management tool has no knowledge of the routers and thus cannot manage the encapsulated SNA traffic.

A known solution to this heterogeneous network management problem uses two distinct management application platforms: the Netview application executing on the host computer to manage the SNA resources and a SNMP application executing on a management console station to manage the IP routers. However, use of two distinct management platforms is generally cumbersome and inefficient, particularly because there is no means for correlating the SNA and IP resources. The present invention is directed to the efficient management of an integrated computer network of heterogeneous resources and, further, to a correlation technique that allows such management from a single console station.

SUMMARY OF THE INVENTION

The invention comprises a technique for correlating information pertaining to heterogeneous resources of an integrated computer network to enable management of the network from a single console workstation. The integrated network environment is generally managed by a predetermined application tool executing on the management console that provides an application-centric map of the network for communicating with resources conversant with the application tool. Information pertaining to other protocol-specific resources are overlaid on the map to facilitate monitoring of those protocol-specific resources by the application tool and to assist in problem isolation. As a result, the console can interactively access the application-centric resources while also obtaining status information from the protocol-specific resources of the network.

In the illustrative embodiment, the predetermined application tool is a Simple Network Management Protocol (SNMP) tool executing on a management console and the protocol-specific resources are System Network Architecture (SNA) physical unit (PU) and logical unit (LU) entities. Route information pertaining to these SNA entities are preferably stored on a virtual telecommunication access method (VTAM) table of a host computer coupled to the network. The contents of the VTAM table include, inter alia, address definitions of the SNA PU and LU entities.

The SNMP console communicates with the application-centric resources, such as Internet protocol (IP) routers, using a SNMP protocol to create an IP-centric network map of IP routers. In addition, the host computer acquires route information specifying optimal paths among the heterogeneous resources via source-route-bridge (SRB) network operations.

In accordance with the invention, the SNA-specific resource information, including the VTAM definitions and SRB information, are provided from the host computer to the SNMP console for storage in a database of the management workstation. This information is then overlaid on the IP-centric map of the network to correlate the SNA and IP resources. Such correlation allows the SNMP console to manage relationships between the SNA and IP resources for purposes of, e.g., activating/deactivating those resources and monitoring SNA frame traffic encapsulated within IP protocol packets. In addition, the inventive correlation technique may be used for troubleshooting operations to identify associations between specific IP and SNA resources, and to generally view dependency relationships between such resources in the heterogeneous environment.

BRIEF DESCRIPTION OF THE DRAWINGS

The above and further advantages of the invention may be better understood by referring to the following description in conjunction with the accompanying drawings in which like reference numbers indicate identical or functionally similar elements.

DESCRIPTION OF THE ILLUSTRATIVE EMBODIMENTS

Figure 2:
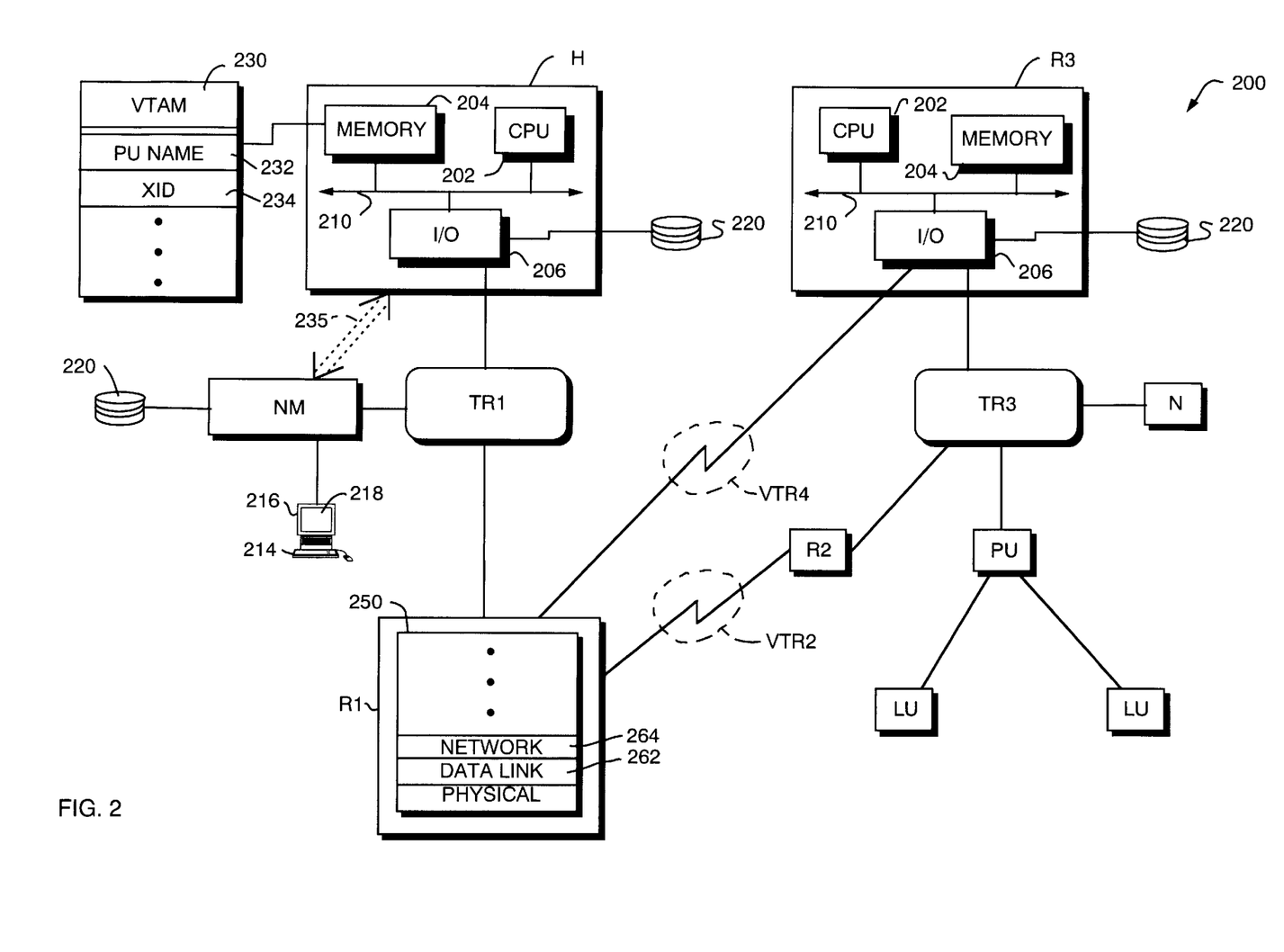
FIG. 2 is a block diagram of a collection of interconnected subnetworks of a computer network having a plurality of stations on which the present invention may advantageously operate.

FIG. 2 is a block diagram of a computer network 200 comprising a collection of interconnected subnetworks attached to a plurality of stations. The stations are typically general-purpose computers comprising a host computer H station, end N station, a network management NM console workstation, a physical unit PU station and a plurality of intermediate stations R1–R3. Each station typically comprises a central processing unit (CPU) 202, a memory unit 204 and an input/output (I/O) unit 206 interconnected by a system bus 210. The memory unit 204 may comprise storage locations typically composed of random access memory (RAM) devices, which are addressable by the CPU 202 and I/O unit 206. An operating system, portions of which are typically resident in memory and executed by CPU, functionally organizes the node by, inter alia, invoking network operations in support of software processes executing on the CPU.

The I/O unit 206, in turn, connects the station to mass storage devices, such as disk 220, and to the subnetworks. The NM console workstation further includes a conventional display monitor 216 with a display screen 218 and cursor control devices, such as a keyboard 214, connected to I/O unit. A window environment, such as a graphical user interface (GUI), is preferably displayed on the screen 218 as a graphical display to facilitate interactions between a user and the console. For the NM workstation and intermediate stations R1–R3, the disk 220 may function as a database for storing routing information, as described further herein. Typically, the I/O unit 206 receives information, such as control, address and data signals, from the keyboard 214 or the database 220, and provides that information to the CPU 202 for display on the screen 218 or for transfer over the subnetworks.

The subnetworks included within system 200 are preferably local area networks (LANs) interconnected by intermediate stations R1–R3. Communication among the stations coupled to the LANs is typically effected by exchanging discrete data frames specifying addresses of, e.g., source and destination stations. In the illustrative embodiment of the invention, the LANs are preferably token ring (TR) subnetworks and the intermediate stations are preferably Internet protocol (IP) routers. However, in an alternate embodiment of the invention, the LANs may comprise other subnetworks, such as FDDI, and the intermediate stations may comprise bridges.

Further to the illustrative embodiment, the computer network 200 is preferably an integrated network of heterogeneous resources, such as IP routers and Systems Network Architecture (SNA) entities. The IP routers are generally managed by a predetermined protocol application, e.g., a Simple Network Management Protocol (SNMP) tool, executing on the network management NM station or console.

The SNA entities include physical units (PU) and logical units (LU). A PU is defined as a component that monitors the station's resources, such as a concentration of LUs. Each station in a SNA network contains a PU or an LU, and is identified by its type. The PU is responsible for connecting the LUs to the host in a hierarchical arrangement. LUs are also identified as being of a particular type, and the LU type defines a particular set of SNA services implemented by the LU. As an example, the PU may be a computer coupled to an LU, the latter of which may comprise an intelligent storage device or another computer station; alternatively, the LU and PU could be processes executing within the same station.

Typically, management of the SNA entities takes place on the host computer H in accordance with a network management application program, such as NetView, executing on the host. The application can access the status of the PU and LU entities by virtue of their definitions contained in a specialized data structure 230 of the host computer memory 204. This data structure is a virtual telecommunication access method (VTAM) table 230 having entries whose contents define all the PUs and LUs with respect to the host computer. The content definitions of the entries comprise a name (e.g. PU name 232) and exchange identifier (XID 234), the latter being a unique identifier that identifies each SNA resource to the host. That is, the XID is unique for each PU on a network at a given time.

The NetView application manages those SNA resources known to it; as used in this context, the term "managing" means that the application program can check and change the status of the resources, and can further control those resources to acquire, e.g., information leading to the traffic patterns on the resources. However, the NetView application cannot manage the component in the routers R1–R3 that encapsulate SNA traffic. As noted, the routers R1–R3 are preferably managed by the SNMP tool executing on the NM console which communicates with SNMP agents resident on the routers. The IP routers are key to communication between the host and PUs/LUs because they facilitate the flow of token ring data frames throughout the system 200 by directing those frames to the proper receiving stations.

Figure 3A:
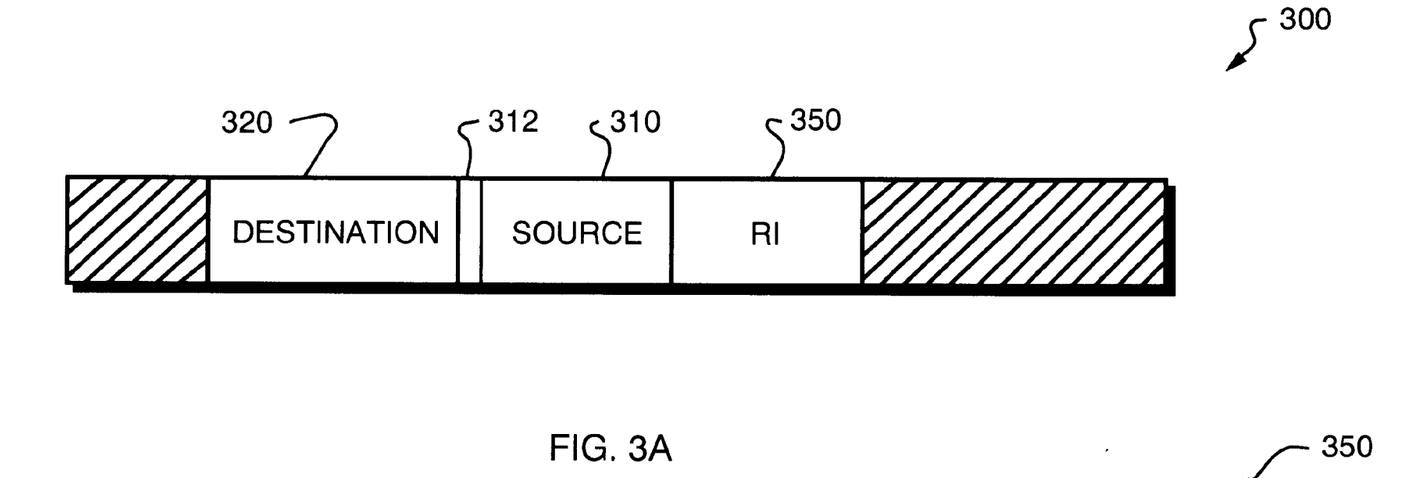
FIGS. 3A and 3B are schematic diagrams depicting the format of a token ring frame having a routing information field for use with a novel address correlation technique in accordance with present invention.

FIG. 3A is a schematic diagram depicting the format of a conventional token ring frame 300 having a routing information (RI) field 350. Typically, the frame contains, inter alia, a source address (SOURCE) field 310 identifying the station sending the frame. A first bit field 312 of the source address is preferably used to identify whether routing information iscontained in the frame. In addition, a destination address (DESTINATION) field 320 identifies the station or stations that should receive the frame 300.

Figure 3B:
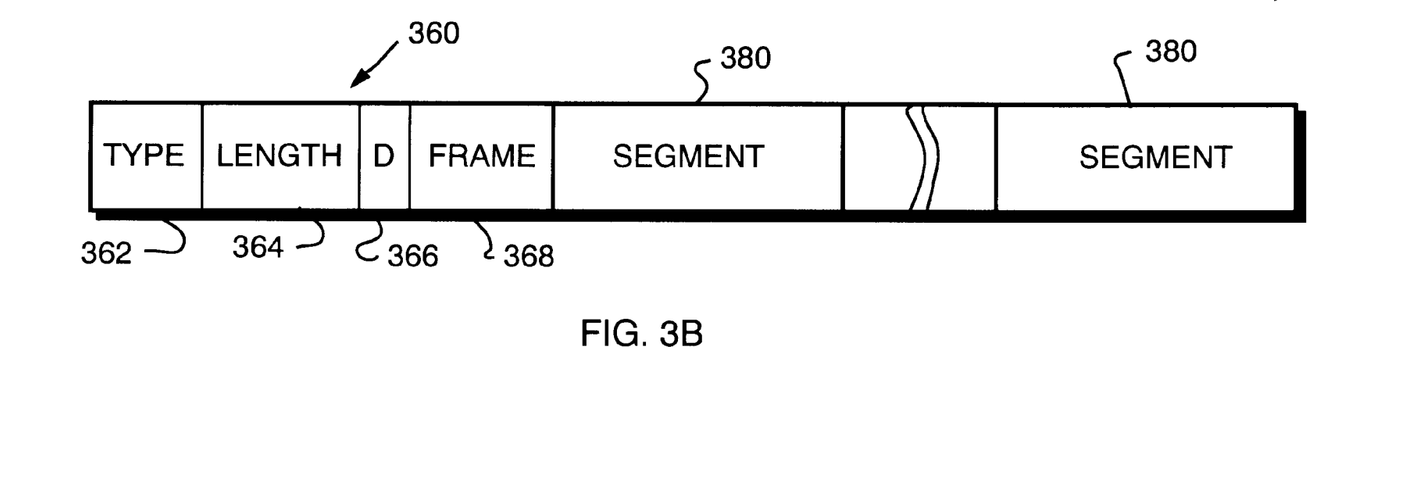

The RI field 350 is a variable-length field, e.g., up to 18-bytes in length, used when the frame 300 traverses a router from one LAN to another in the computer network 200. FIG. 3B shows the format of the RI field 350 containing a 2-byte control information field 360 followed by a series of 2-byte segment number (SEGMENT) fields 380. Each ring subnetwork in the computer network 200 is assigned a unique ring number and each router is assigned a bridge number; together, these numbers form a segment number that defines the route a frame travels. In particular, the first 12 bits of each SEGMENT field 380 specifies the ring number and the remaining 4 bits indicate the bridge number.

It should be noted that, from the perspective of the SNA management application executing on the host computer, routers appear as bridges in the integrated network 200. That is, a router actually functions as a source route bridge in the SNA portion of the network, while functioning as a router in the IP portion of the network. Moreover, from the perspective of the host computer and PU, a virtual token ring (VTR) lies between two adjacent routers, whether or not a ring actually exists. Remote-Source-Route-Bridging (RSRB) is a software component in the router that permits transmission of token ring traffic across an IP network. Specifically, RSRB functions to give the IP network the appearance of a single hop in a token ring network. This hop is the VTR. For example in FIG. 2, VTR4 couples R1 to R3 and VTR2 connects R1 to R2. The association of the two adjacent routers is called a "peer" relation and this relation must exist to exchange RSRB traffic across the VTR. It should be noted that in the case of DLSw, VTR is of local significance only.

The control information field 360 comprises a type (TYPE) field 362 that identifies the type of frame; a length (LENGTH) field 364 that specifies the number of bytes in the RI field; a direction (D) field 366 that indicates whether the frame is traveling from the source station or back to that station; and a largest frame (FRAME) field 368 containing a value that represents common frame sizes.

In general, when a source station transmits a frame over a LAN, the frame is sent to all stations on that LAN. If the intended recipient of the frame is connected to another LAN, the frame is passed over any intermediate-connecting router to that other LAN. Moreover, if the source knows the address of, and the optimal route to, a destination station, the token ring frame 300 is transmitted to the destination as a specifically-routed frame with the destination address contained in the DESTINATION field 320 and the routing information stored in RI field 350.

Referring to FIG. 2, a key function of the router is to determine the next node to which the frame is sent; this routing function is preferably performed using the network layer 264 of a protocol stack 250 within each station. In the case of a bridge, its primary function is to store and forward frames between similar LANs; this function is preferably performed by the data link layer 262 of stack 250. Specifically, the LANs must have compatible implementations of the logical link control (LLC) sublayer (FIG. 1) of the data link layer 262, despite any differences in frame formats and sizes between the media access control (MAC) sublayers of the LANs; in any event, these latter differences must be resolved by the intermediate station.

As an example, assume the host computer H sends a token ring frame having a destination address of the PU over TR1. The frame is received by router R1 which encapsulates the token ring frame in an IP packet by adding an IP network header to the frame. In a configuration comprising two routers coupled together by a virtual token ring network, the first router encapsulates the token ring frame to an IP packet format and the second router de-encapsulates the IP packet to recover the original frame. Here, R1 passes the encapsulated packet, e.g., over VTR2 to R2 in accordance with a routing algorithm executed on R1. R2, in response to receiving the IP packet, de-encapsulates it by stripping the IP header and recovering the original token ring frame. The original frame is then transmitted over TR3 to the PU.

Depending upon how the LANs are interconnected, there may be more than one possible path for a frame to follow. If the intended recipient of the frame issued by host computer H is the station PU, the frame may also be passed over TR1 through router R1, over VTR4 and through R3 onto TR3. For those cases where there are more than one path to a destination station, the source station must "discover" the optimal path to that destination. Source-Route-Bridge (SRB) is a source routing technique used by a source station to discover the optimal path to the destination. According to this networking technique, the source station specifies the optimal route, which is determined in accordance with routing information acquired from the stations of the network. An explorer frame is typically used by the source to collect and store the information in the RI field 350 of the frame 300.

When a token ring frame 300 is transmitted as an explorer frame, each router that forwards the frame to a different ring adds a segment number to the SEGMENT field 380. For example, station PU creates and transmits an explorer frame that is received by each station on TR3. When the frame reaches router station R3, it is "copied" to VTR4 and a segment number, based on VTR4's ring number and R3's bridge number, is added to the frame. It should be noted that the router is functioning as a source route bridge on the integrated, SNA network and that, although a router is loading information into the RI field 350, the SRB operations actually take place at the data link layer 262. Thus, the contents of the SEGMENT field 380 are concatenated ring-bridge pairs defining the optimal path from the PU to the host computer. The frame is then passed to router R1 which copies the frame to TR1 prior to adding a segment number based on R1 and TR1.

A common type of explorer frame is the broadcast explorer having a format similar to that shown in FIGS. 3A and 3B; for this type of explorer frame, the DESTINATION field 320 contains a broadcast address pertaining to all stations on the LANs, while the contents of field 312 indicate that no routing information is contained in the frame. Accordingly, a copy of this frame eventually reaches every station on every LAN of the network.

Each receiving station may respond to the broadcast explorer frame by issuing a response frame to the PU that contains the receiving station's MAC address and routing information to that station. The format of the response frame is also generally the same as that shown in FIGS. 3A and 3B; however, the contents of the D field 366 are inverted from that of an explorer frame to indicate that the frame is traveling back to the PU.

Upon receiving these response frames, the PU station examines the paths followed by the explorer frames and chooses the best path for a particular destination. In many cases, the "optimal" route chosen is the one specified by the routing information contained in the first response to reach the PU. For example, an optimal route between the PU and host computer H specified by the RI field may comprise the following ring-bridge pairs: (ring TR) 3-(bridge R) 2; (ring VTR) 2-(bridge R) 1; and (ring TR) 1-(bridge) 0. The last bridge number is zero because there is no bridge/router after TR1.

Because the SNA management tool executing on the host computer cannot identify routers in the network, that tool cannot identify which of the two paths is used for communication between the host and the PU despite having access to routing information specified by the RI field 350; accordingly, that tool cannot detect failures along the communication paths. Likewise, the SNMP application executing on the NM console may not be able to isolate a failing router in a communicating path because it is unaware of the destination of the frame. In order to manage this type of heterogeneous network, a network manager must know the precise configuration of the network which, in many cases, is quite cumbersome and inefficient.

In accordance with the invention, a novel technique is provided for correlating information pertaining to heterogeneous resources of an integrated computer network to enable management, including problem isolation, of the network from a single management console. The integrated network environment is generally managed by a predetermined application tool executing on the management console that provides an application-centric map of the network for communicating with resources conversant with the application tool. Route information pertaining to other protocol-specific resources are overlaid on the map to facilitate monitoring of those protocol-specific resources by the application tool. As a result, the console can interactively access the application-centric resources while also obtaining status information from the protocol-specific resources of the network.

The predetermined application tool is preferably the SNMP tool executing on the NM console and the protocol-specific resources are SNA PU and LU entities. SNA-specific resource information, such as name and address definitions, pertaining to these SNA entities are stored on the VTAM table 230 of the host computer H. This information, together with the contents of the RI field specifying the optimal path to the PU, are provided from the host computer H to the NM console for storage on the database 220 of the NM console.

Specifically, contents of the RI field 350 are extracted from the explorer frame at the host computer H and provided, along with the VTAM table definitions, over a "pipe" network connection 235 for storage on a SNA-specific portion of the NM workstation database 220. It should be noted that the host computer H only provides the RI field contents of one explorer frame, although two explorer frames were actually received by H. This is because the PU typically selects the route specified in the first response frame as the optimal route and forwards a subsequent response frame back to the host over that optimal route. The intervening routers load information pertaining to the optimal route into the RI field and the host extracts that information and transmits it over the connection 235 for storage on the database 220.

At the NM console, the contents of the RI field 350 are parsed into SEGMENT fields 380 comprising the ring-bridge pairs described above, e.g., (ring TR) 3-(bridge R) 2; (ring VTR) 2-(bridge R) 1; and (ring TR) 1-(bridge) 0. Since the format of these segment fields is known, the NM console extracts the ring number "3" from first 12 bits and extracts the bridge number "2" from the next four bits; this operation continues for each of the remaining ring-bridge pairs.

The NM console then performs IP device discovery operations by querying the agents of application-centric resources, such as the IP routers, using a SNMP protocol to create an IP-centric network map of the router addresses. Specifically, the NM console queries the IP devices to provide topology information via a management information base (MIB) implemented on the SNMP agents of the routers. The information contained in the MIB includes, inter alia, all the virtual and (real) token rings connected to each router, the relationship between adjacent routers, i.e., whether the routers are connected by way of a virtual or real ring, and the bridge number for each router. The MIB and SNMP protocol, and their use in providing network management information between SNMP management stations and agents are well-known and described in, e.g., SNMP, SNMPv2 and RMON by William Stallings, printed by Addison Wesley Publishing Company, 1996.

Figure 4:
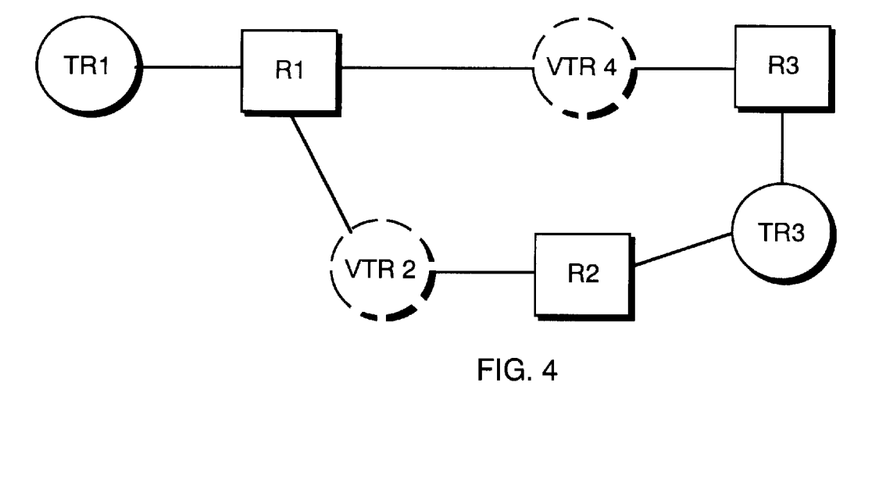
FIG. 4 is a chematic block diagram of an IP-centric map of the computer network of FIG. 2 for use with the novel address correlation technique of the resent invention.

Functionally, the NM console queries R1 as to its current configuration and R1 responds with information that it is connected to physical token ring TR1 and virtual token rings VTR2 and 4; R1 further provides its bridge number, e.g., "BR1", to the console. The topology information is stored on an IP-centric portion of the NM database 220 that enables the NM console to determine the status and configurations of the routers; thereafter, the console uses this information to create the IP-centric map of the computer network. FIG. 4 is a schematic block diagram of an IP-centric map of the computer network (FIG. 2) as displayed on the GUI screen 218 of monitor 216. Because the map is created by querrying the IP routers R1–R3, the structure and organization of only those routers and their interconnecting token ring LANs are displayed.

The SNA-specific resource information, including the PU name and its corresponding RI information, are then overlaid on the IP-centric map of the network to correlate the SNA and IP resources. Overlaying operations performed at the NM console generally comprise table look-ups and compares to correlate the information sets. Specifically, the NM console uses the recovered ring and bridge numbers from the parsed SEGMENT fields to produce a plurality of ring-bridge-ring sequences, e.g., the ring-bridge-ring sequence of "3 2 2". The NM console correlates this unique sequence of "3 2 2" with a similarly unique router information sequence from the IP-centric portion of the database. That is, the NM console searches the router information for a router having bridge number "2" that is connected to TR3 and VTR2. Upon discovering the unique sequence in the IP-centric database, the NM console can isolate router R2 as connecting the two token rings. The next extracted sequence of "2, 1, 1" identifies router R1 as being uniquely connected between VTR2 and TR1. The two routers used by the PU for connectivity to the host H are thus identified, as is the relationship between the PU name and IP resources used for connectivity.

Figure 5:
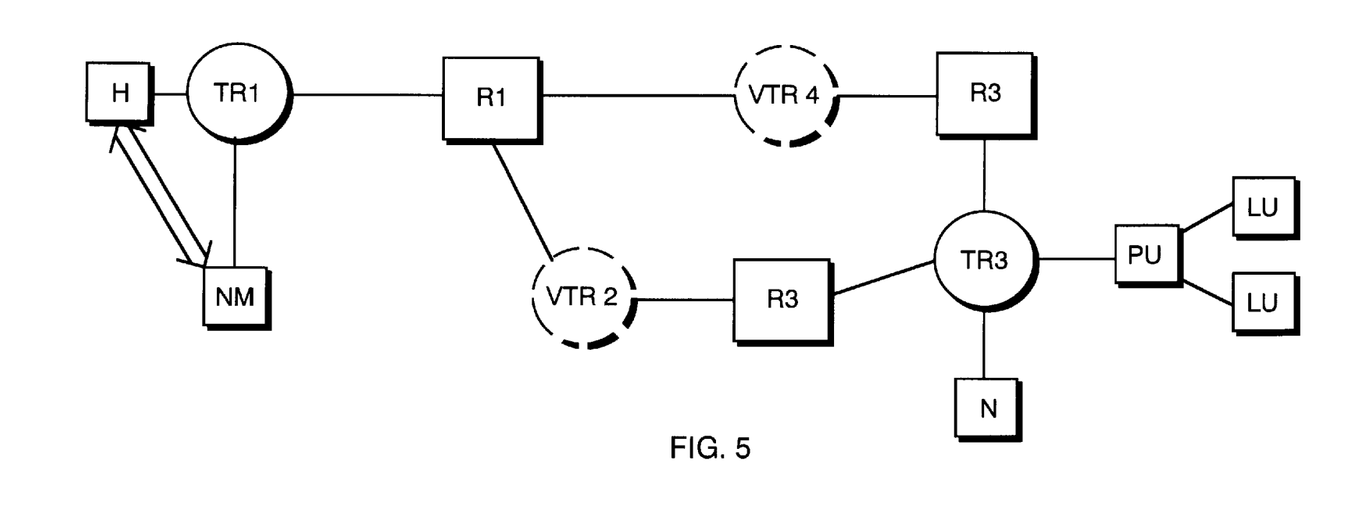
FIG. 5 is a schematic block diagram of the topology of an integrated network map of heterogeneous resources that is created in accordance with the novel address correlation technique of the present invention.

Thereafter, each router is polled using the SNMP protocol to constantly update the database with current router information in the event a router is added or becomes degraded. For example, if R2 ceases to function correctly, the PU may choose R3 and R1 as the new path to the host computer. The ring-bridge pair contents of the SEGMENT fields 380 provided by the routers will change to reflect the newly discovered path and this updated change will be further reflected in the NM database 220. The updated information can then be displayed graphically on the GUI screen 218 to depict the topology of SNA entities connected to the host computer H via non-SNA devices. FIG. 5 is a schematic block diagram of the topology of an integrated network map of heterogeneous resources that is created in accordance with the novel address correlation technique.

In summary, the invention provides a technique that correlates route information from one set of resources with topology information from a different set of resources. Advantageously, the correlation technique allows the NM console to manage relationships between the SNA and IP resources for purposes of activating/deactivating those resources and monitoring SNA frame traffic encapsulated within IP protocol packets. In addition, the inventive correlation technique may be used for troubleshooting operations to identify associations between specific IP and SNA resources, and to generally view dependency relationships between such resources in the heterogeneous environment.

While there has been shown and described an illustrative embodiment for managing heterogeneous resources of an integrated network environment from a single network management station by correlating information pertaining to those resources, it is to be understood that various other adaptations and modifications may be made within the spirit and scope of the invention. For example, the syntax of information stored in the SNA-specific portion of the database and the IP-centric portion of the database may be different. The NM console compensates for any differences by extracting appropriate information from the database portions and placing them into a format that allows comparison between the contents of those portions. Such extraction eliminates the need to transform individual values to a common base line.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for managing heterogeneous resources of an integrated network having a host computer and a single network management station coupled to the network, the heterogeneous resources including application-specific resources and protocol-specific resources, the method comprising the steps of:

A. generating an application-centric map of the network using an application tool running on the network management station, the application-centric map specifying information pertaining to application-specific resources conversant with the application tool;

B. providing information of the protocol-specific resources from the host computer to the network management station;

C. correlating the information pertaining to the application-specific and protocol-specific resources at the network management station to enable management of the network heterogeneous resources from the management station; and D. controlling both the application-specific resources and the protocol-specific resources via the management station, based upon correlated information produced in Step C from the information pertaining to the application-specific and protocol-specific resources; p1 wherein the information pertaining to the application-specific resources and the information pertaining to the protocol-specific resources are stored in respective portions of a database and have different respective syntaxes, and the single network management station is configured to compensate for said different respective syntaxes by placing contents of said portions into a format that permits comparison therebetween.

2. The method of claim 1 wherein the step B comprises the steps of:

B1. acquiring a portion of the information using a predetermined network technique that specifies an optimal path between the protocol-specific resources and the host computer; and B2. acquiring a remaining portion of the information from a data structure of the host computer, the remaining portion specifying definitions of the protocol-specific resources.

3. The method of claim 2 wherein the step C comprises the step of:

C1. overlaying the information of the protocol-specific resources onto the application-centric map to facilitate monitoring of the protocol-specific resources by the application tool.

4. The method of claim 1 wherein the step B comprises the step of:

B3. providing the information over a pipe connection coupling the host computer to the management station.

5. The method of claim 2 wherein the predetermined network technique of step B1 is source-route-bridging.

6. The method of claim 3 wherein the application-specific resources are routers and wherein the application tool is a simple network management protocol tool configured to generate the application-specific map, and wherein the application-specific map in step A specifies topology information.

7. The method of claim 6 wherein the protocol-specific resources are physical unit (PU) and logical unit (LU) entities and wherein the information provided by the entities in step B are route information.

8. The method of claim 7 wherein the data structure of step B2 is a virtual telecommunication access method table whose contents define the PU and LU entities with respect to the host computer.

9. An arrangement for managing heterogeneous resources of an integrated network having a host computer and a single network management station coupled to the network, the heterogeneous resources including application-specific resources and protocol-specific resources, the arrangement comprising:

an application tool executing on the network management station for generating an application-centric map of the network, the application-centric map specifying topology information of application-specific resources conversant with the application tool;

a data structure of the host computer having entries for storing information pertaining to definitions of the protocol-specific resources;

a pipe connection for transferring the definitions from the host computer to the network management station;

means for correlating the information pertaining to the application-specific and protocol-specific resources at the single network management station to enable management of both the application-specific and protocol-specific resources from the single management station; and means for controlling, via the single management station, both the application-specific and protocol-specific resources based upon correlated information produced by the means for correlating from the information pertaining to the application-specific and protocol specific resources;

wherein the information pertaining to the application-specific resources and the information pertaining to the protocol-specific resources are stored in respective portions of a database and have different respective syntaxes, and the single network management station is configured to compensate for said different respective syntaxes by placing contents of said portions into a format that permits comparison therebetween.

10. The arrangement of claim 9 further comprising means for executing source-route-bridging operations so that the host computer acquires route information for transfer over the pipe connection to the network management station, the route information specifying optimal paths among the heterogeneous resources.

11. The arrangement of claim 10 wherein the application-specific resources are routers and wherein the application tool is a simple network management protocol (SNMP) tool configured to generate the application-centric map.

12. The arrangement of claim 11 wherein the protocol-specific resources are physical unit (PU) and logical unit (LU) entities.

13. The arrangement of claim 12 wherein the routers include SNMP agents that are queried by the network management station using a SNMP protocol to create the application-centric map.

14. The arrangement of claim 13 wherein the topology information specified by the application-centric map comprises addresses and relationships of the routers.

15. The arrangement of claim 14 wherein the host computer acquires the route information by extracting the contents of a routing information field from an explorer frame and wherein the route information is provided over the pipe connection along with the definitions of the PU and LU entities.

16. The arrangement of claim 15 wherein the data structure is a virtual telecommunication access method table.

17. A method for managing heterogeneous resources of an integrated network having a host computer and a single network management station coupled to the network, the heterogeneous resources including application-specific resources and protocol-specific resources, the method comprising the steps of:

generating an application-centric map of the network using an application tool running on the network management station, the application-centric map specifying topology information pertaining to application-specific resources conversant with the application tool;

acquiring route information (i) using a predetermined network technique that specifies an optimal path between the protocol-specific resources and the host computer, and (ii) from a table of the host computer, the table having entries whose contents define the protocol-specific resources with respect to the host computer;

correlating the topology and route information at the network management station to enable management of the heterogeneous resources from the single management station; and controlling at the single management station both the application-specific resources and the protocol-specific resources based upon correlated topology and route informations;

wherein the topology information and route information have different respective syntaxes and are stored in different respective portions of a database, and the network management station is configured to compensate for differences in said syntaxes by placing the portions of the database into a format that permits comparison between contents of said portions.

18. The method of claim 17 wherein the contents of the table entries comprise a name and exchange identifier, the latter being a unique identifier that identifies each protocol-specific resource to the host.

19. The method of claim 17 wherein the predetermined network technique is source-route-bridging using an explorer frame and wherein the step of acquiring route information further comprises the step of extracting the contents of a routing information field from the explorer frame at the host computer.

20. The method of claim 19 wherein the step of extracting comprises the step of parsing the contents of the routing information field into segment fields comprising ring-bridge pairs.

21. The method of claim 1, further comprising displaying on a console of the management station a graphical representation of the integrated network based upon the correlated information.

22. The arrangement of claim 9, further comprising means for graphically displaying at the management station a representation of the integrated network based upon the correlated information.

23. The method of claim 17, further comprising the step of displaying on a console of the management station a graphical representation of the integrated network based upon the correlated information.

24. The method of claim 1, wherein the application-specific resources are IP devices, and the protocol-specific resources are SNA devices.

25. The arrangement of claim 9, wherein the application-specific resources are IP devices, and the protocol-specific resources are SNA devices.

26. The method of claim 17, wherein the application-specific resources are IP devices, and the protocol-specific resources are SNA devices.

27. The method of claim 1, wherein the step of controlling both the application-specific resources and the protocol-specific resources comprises the step of controlling activation and deactivation of the application-specific and protocol-specific resources via the management station.

28. The arrangement of claim 9, wherein the means for controlling permits activation and deactivation of both the application-specific and protocol-specific resources controlled via the management station.

29. The method of claim 17, wherein the step of controlling comprises the step of controlling activation and deactivation of the application-specific and protocol-specific resources via said management station.

* * * * *